United States Patent
Onodera et al.

(10) Patent No.: US 8,258,420 B2
(45) Date of Patent: Sep. 4, 2012

(54) WIRE ELECTRICAL DISCHARGE MACHINING APPARATUS

(75) Inventors: Yasuo Onodera, Chiyoda-ku (JP);
Tatsushi Sato, Chiyoda-ku (JP);
Takashi Hashimoto, Chiyoda-ku (JP);
Hisashi Yamada, Chiyoda-ku (JP);
Koichiro Hattori, Chiyoda-ku (JP);
Yoshikazu Ukai, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 623 days.

(21) Appl. No.: 12/375,366

(22) PCT Filed: Oct. 24, 2006

(86) PCT No.: PCT/JP2006/321180
§ 371 (c)(1),
(2), (4) Date: Jan. 27, 2009

(87) PCT Pub. No.: WO2008/050406
PCT Pub. Date: May 2, 2008

(65) Prior Publication Data
US 2010/0012626 A1    Jan. 21, 2010

(51) Int. Cl.
*B23H 7/04* (2006.01)
*B23H 1/02* (2006.01)
(52) U.S. Cl. .................. 219/69.12; 219/69.13
(58) Field of Classification Search ............... 219/69.12, 219/69.13, 69.18
See application file for complete search history.

(56) References Cited

U.S. PATENT DOCUMENTS
4,652,717 A * 3/1987 Briffod et al. ............... 219/69.12

FOREIGN PATENT DOCUMENTS

| | | |
|---|---|---|
| EP | 0 178 544 A2 | 4/1986 |
| JP | 59-47123 A | 3/1984 |
| JP | 60-29230 A | 2/1985 |
| JP | 61/209819 A | 9/1986 |
| JP | 61-288930 A | 12/1986 |
| JP | 1-97525 A | 4/1989 |
| JP | 2-30429 A | 1/1990 |
| JP | 6-61663 B2 | 8/1994 |
| WO | 95/10382 A1 | 4/1995 |

* cited by examiner

*Primary Examiner* — Geoffrey S Evans
*Assistant Examiner* — Thomas Ward
(74) *Attorney, Agent, or Firm* — Sughrue Mion, PLLC

(57) ABSTRACT

A wire electrical discharge machining apparatus includes a unit capable of separately opening and closing each of a high impedance path and a low impedance path, a unit that sets an open/close pattern in which a combination of closing one of the feeding paths and opening another one of the feeding paths is designated for switching power feeding between the high impedance path and the low impedance path, a unit that changes pulse energy per feeding pulse in a present feeding path to reduce a difference in discharge pulse energy applied to an inter-electrode gap from a machining power supply between at a time of high-impedance-path feeding and at a time of low-impedance-path feeding, and a unit that controls opening and closing of the path open/close unit in accordance with the changed open/close pattern.

8 Claims, 6 Drawing Sheets

(a)　　　　　　　　(b)

WIRE ELECTRICAL DISCHARGE MACHINING APPARATUS

TECHNICAL FIELD

The present invention relates to a wire electrical discharge machining apparatus.

BACKGROUND ART

In a wire electrical discharge machining apparatus, a wire as one electrode is running in an up-down direction and is arranged to be opposed to a workpiece as the other electrode that is controlled to move on a plane perpendicular to the wire running direction. A pulse discharge is caused in an opposing gap between the wire and the workpiece (i.e., inter-electrode gap), and the workpiece is machined into a desired shape by utilizing heat energy generated due to the discharge.

In the wire electrical discharge machining apparatus, in a configuration for supplying power to the machining electrodes, the workpiece is directly connected to one electrode of a machining power supply and the running wire is connected to the other electrode of the machining power supply through a feeding point on which the wire is slidable. Generally, two feeding points are provided; one above and the other below the workpiece. In other words, there are two circuits in parallel on upper and lower sides of the workpiece as paths for a discharge current supplied to the inter-electrode gap.

The wire electrical discharge machining apparatus generally employs two machining power supplies: a sub discharge power supply for inducing spark discharge (pre-discharge) with small current and a main discharge power supply for supplying large current as a machining current after generation of the spark discharge to perform rough machining and finish machining.

In the wire electrical discharge machining apparatus, wire breakage sometimes occurs depending upon the machining conditions. The wire electrode is locally overheated, which results in wire breakage. Conventionally, various technologies have been proposed for preventing wire breakage by preventing the local overheating of the wire electrode (for example, see Patent Documents 1 to 3 (JP 59-47123 A, JP 1-97525 A and JP 6-61663 B2, respectively) and the like).

Specifically, a technology is disclosed in Patent Document 1 (JP 59-47123 A) in which switching elements are provided on each discharge current path from a main discharge power supply to upper and lower side feeding points for opening and closing the discharge current paths individually so that a one-side feeding for supplying a main machining current from only one of the feeding points is performed, and an upper-side feeding only from the upper-side and a lower-side feeding only from the lower side are switched every predetermined number of continuously applied pulse voltages. With this technology, large current can be applied without overheating the wire electrode, enabling to prevent wire breakage due to the heat generation.

In Patent Document 2 (JP 1-97525 A), a technology is disclosed in which switching elements are provided on each discharge current path from a main discharge power supply to upper and lower side feeding points for opening and closing the discharge current paths individually so that a one-side feeding for supplying a main machining current from only one of the feeding points is performed, and an upper-side feeding and a lower-side feeding are switched asynchronously. With this technology, occurrence of a concentrated discharge can be prevented, so that breakage of the wire electrode due to heating can be prevented.

In Patent Document 3 (JP 6-61663 B2), a technology is disclosed in which a device is provided for measuring a discharge position in a thickness direction of a workpiece based on a difference and a magnitude relation of current flowing from a sub discharge power supply to an upper-side feeding point and a lower-side feeding point, and switching elements are provided on each current path from a main discharge power supply to the upper-side feeding point and the lower-side feeding point for opening and closing the current paths individually. When spark discharge occurs on the upper end side in the thickness direction of the workpiece, the upper-side feeding is performed, when spark discharge occurs on the lower end side in the thickness direction of the workpiece, the lower-side feeding is performed, and when spark discharge occurs at the center of a workpiece in the thickness direction, an upper-and-lower-both-side feeding for supplying current from upper-and-lower-both sides simultaneously is performed. The local overheating of the wire electrode in the center in the up-down direction in the thickness direction of the workpiece in which cooling effect tends to be insufficient can be prevented by switching the feeding system in accordance with the discharge position.

In a wire electrical discharge machining apparatus, as disclosed in Patent Document 2 (JP 1-97525 A), machining liquid nozzles are generally provided on the wire running path between the upper and lower wire guides at positions that are close in the up-down direction with an opposing position to the workpiece therebetween, and a wire electrode is cooled and discharge machining swarf is removed by ejecting a high-pressure machining liquid into the machining gap from upward and downward.

DISCLOSURE OF INVENTION

Problem to be Solved by the Invention

In the upper-and-lower-both-side feeding system, if there is deviation of impedance between two circuits in parallel on upper and lower sides of the workpiece as paths for a discharge current, it results in causing difference between discharge current values supplied from the upper-side feeding path and the lower-side feeding path to a discharging position. Therefore, when concentrated discharge occurs, a wire electrode is overheated on a side having a larger discharge current value, causing wire breakage more easily. Performing the upper-side feeding and the lower-side feeding as disclosed in Patent Documents 1 (JP 59-47123 A) and 2 (JP 1-97525 A) is effective in preventing wire breakage due to the concentrated discharge; however, when only one-side feeding is performed, short circuit occurs frequently, thereby lowering machining speed.

On the above point, in the technology disclosed in Patent Document 3 (JP 6-61663 B2), the one-side feeding system and the upper-and-lower-both-side feeding system are used in combination, and therefore the technology disclosed in Patent Document 3 (JP 6-61663 B2) is considered to enable stable machining by preventing frequent short circuit occurrences. However, there still remains a problem of deviation of impedance that may occur between the upper-side feeding path and the lower-side feeding path.

A discharge current path at the time of upper-and-lower-both-side feeding is equivalent to two circuits as discharge current paths in parallel at the time of the one-side feeding. Therefore, impedance of the discharge current path at the time of the upper-and-lower-both-side feeding is equivalent to ½ impedance of the discharge current path at the time of the one-side feeding. That is, the power feeding at the time of the one-side feeding is from a high impedance path, and the power feeding at the time of the upper-and-lower-both-side feeding is from a low impedance path. In this case, discharge pulse energy at the time of the upper-and-lower-both-side feeding is set not to be excessive in Patent Document 3 (JP 6-61663 B2), so that the discharge pulse energy at the time of the one-side feeding is made small, creating a problem that the intended machinable speed can not be sufficiently utilized without occurrence of wire breakage.

In the wire electrical discharge machining apparatus, a mixed mode of power feeding from a high impedance path and power feeding from a low impedance path is applied to, for example, one of the upper-side feeding path and the lower-side feeding path as well as a combination use of the one-side feeding and upper-and-lower-both-side feeding. In such cases, the same problem can be pointed out.

The present invention has been achieved in view of the above discussion, and it is an object of the present invention to provide a wire electrical discharge machining apparatus enabling improving machining speed at power feeding from a high impedance path when the high impedance path and a low impedance path are used in combination for a main discharge current path.

Means for Solving Problem

To achieve the above objects, there is provided a wire electrical discharge machining apparatus, when comprising a high impedance path and a low impedance path as feeding paths for supplying a main discharge current from a machining power supply to an inter-electrode gap between a wire electrode and a workpiece, includes a path open/close unit capable of separately opening and closing each of the high impedance path and the low impedance path; an open/close pattern setting unit that sets an open/close pattern in which a combination of closing one of the feeding paths and opening another one of the feeding paths is designated for switching power feeding between the high impedance path and the low impedance path; a feeding-pulse-energy changing unit that generates a new open/close pattern in which a pulse energy per feeding pulse is changed in a present feeding path indicated by the open/close pattern by the open/close pattern setting unit such that a difference in discharge pulse energy applied to the inter-electrode from the machining power supply is reduced between at a time of power feeding from the high impedance path and at a time of power feeding from the low impedance path; and a drive unit that controls opening and closing of the path open/close unit in accordance with the new open/close pattern generated by the feeding-pulse-energy changing unit.

According to the present invention, a difference in feeding pulse energy between at the time of power feeding from a high impedance path and at the time of power feeding from a low impedance path can be made small, enabling to improve machining speed at power feeding from the high impedance path.

Effect of the Invention

According to the present invention, when a high impedance path and a low impedance path are used in combination for a main discharge current path, machining speed at power feeding from a high impedance path can be improved.

| EXPLANATIONS OF LETTERS OR NUMERALS | |
|---|---|
| 1 | wire electrode |
| 2 | upper-side wire guide |
| 3 | lower-side wire guide |
| 4 | workpiece |
| 5 | upper feeding point |
| 6 | lower feeding point |
| 7 | sub-discharge power supply |
| 8 | main-discharge power supply |
| 8a | small-current main-discharge power supply |
| 8b | large-current main-discharge power supply |
| 9 | upper sub-feeder line |
| 10 | upper sub-switching element |
| 11 | lower sub-feeder line |
| 12 | lower sub-switching element |
| 13 | upper main-feeder line |
| 13a | upper main-high-impedance-feeder line |
| 13b | upper main-low-impedance-feeder line |
| 14, 14a, 14b | upper main-switching element |
| 15 | upper main-feeder line |
| 16 | lower main-switching element |
| 17a, 17b | open/close pattern setting unit |
| 18a, 18b | feeding-pulse-energy changing unit |
| 19a, 19b | oscillator |
| 20 | discharge-frequency detecting unit |
| 21 | discharge-frequency determining unit |
| 22 | feeding-pattern changing unit |
| 23a, 23b | current sensor |
| 24 | discharge-position detecting unit |
| 25 | small-current selecting switching element |
| 26 | large-current selecting switching element |

BEST MODE(S) FOR CARRYING OUT THE INVENTION

Exemplary embodiments of a wire electrical discharge machining apparatus according to the present invention will be explained below in detail with reference to the accompanying drawings.

First Embodiment

Figure 1:
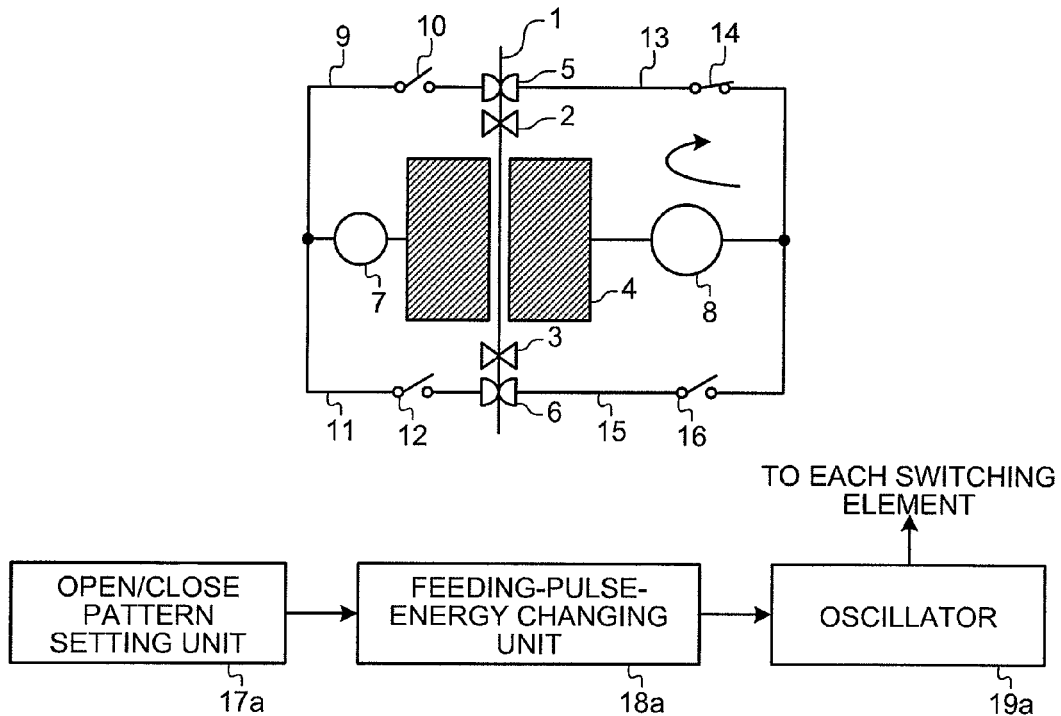
FIG. 1 is a schematic diagram illustrating a configuration of a relevant portion of a wire electrical discharge machining apparatus according to a first embodiment of the present invention.

FIG. 1 is a schematic diagram illustrating a configuration of a relevant portion of a wire electrical discharge machining apparatus according to the first embodiment of the present invention. In FIG. 1, reference numeral 1 denotes a wire electrode. The wire electrode 1 runs, for example from upward to downward, while being guided by wire guides 2, 3 arranged in an up-down direction with an appropriate interval therebetween. A plate-shaped workpiece 4 having a certain thickness is arranged on a plane perpendicular to a wire running direction to be opposed to a wire running path between the upper and lower side wire guides 2, 3 with a predetermined machining gap therefrom (hereinafter, "inter-electrode gap"). An upper feeding point 5 is provided at a position near the upper-side wire guide 2 and a lower feeding point 6 is provided at a position near the lower-side wire guide 3. The wire electrode 1 is slidable on the upper and lower feeding points 5, 6.

Machining liquid nozzles, although not shown, are provided on the wire running path between the wire guides 2, 3 at positions that are close in the up-down direction with an opposing position to the workpiece 4 therebetween. High-pressure machining liquid is ejected from the machining liquid nozzles into the opposing gap between the wire electrode 1 and the workpiece 4 from upward and downward, so that the wire electrode 1 can be cooled and discharge machining swarf can be removed.

A general configuration of a discharge machining unit is explained above. The wire electrical discharge machining apparatus includes a sub-discharge power supply 7 and a main-discharge power supply 8 as machining power supplies for the discharge machining unit. The sub-discharge power supply 7 mainly generates a voltage pulse of a relatively low voltage for supplying a sub-discharge small current to the inter-electrode gap for detecting a state of the machining gap (inter-electrode gap) between the wire electrode 1 and the workpiece 4. The main-discharge power supply 8 mainly generates a voltage pulse of a predetermined pulse width at a predetermined voltage level that is higher than the sub-discharge power supply 7 for supplying a main-discharge large current for machining to the inter-electrode gap. Generally, speaking of machining power supply for a wire electrical discharge machining apparatus, it indicates the main-discharge power supply 8.

One electrode end of the sub-discharge power supply 7 is directly connected to the workpiece 4. The other electrode end of the sub-discharge power supply 7 is connected to the upper feeding point 5 through an upper sub-feeder line 9, and an upper sub-switching element 10 is inserted on the upper sub-feeder line 9. At the same time, the other electrode end of the sub-discharge power supply 7 is connected to the lower feeding point 6 through a lower sub-feeder line 11, and a lower sub-switching element 12 is inserted on the lower sub-feeder line 11.

One electrode end of the main-discharge power supply 8 is directly connected to the workpiece 4. The other electrode end of the main-discharge power supply 8 is connected to the upper feeding point 5 through an upper main-feeder line 13, and an upper main-switching element 14 is inserted on the upper main-feeder line 13. At the same time, the other electrode end of the main-discharge power supply 8 is connected to the lower feeding point 6 through a lower main-feeder line 15, and a lower main-switching element 16 is inserted on the lower main-feeder line 15.

Semiconductor switching elements are used here as the switching elements 10, 12, 14, 16 and in the following embodiments; however, relays can also be used in the same manner.

In this manner, there are two circuits in parallel, one on the upper side and the other on the lower side of the workpiece 4, as paths for a discharge current flowing toward the wire electrode 1 from each of the sub-discharge power supply 7 and the main-discharge power supply 8. Moreover, a switching element is provided on each of those current paths for opening and closing the path. Therefore, the main discharge current can be supplied from the main-discharge power supply 8 while switching between two systems of an upper-and-lower-both-side feeding system using both of the upper and lower feeding points and a one-side feeding system using either one of the feeding points.

In other words, in the above configuration, when the upper and lower sub-switching elements 10, 12 are simultaneously turned on, the upper and lower sub-feeder lines 9, 11 are closed, and a pulse voltage output from the sub-discharge power supply 7 is applied to the machining gap (inter-electrode gap) between the wire electrode 1 and the workpiece 4 through the upper and lower sub-feeder lines 9, 11 and the upper and lower feeding points 5, 6, and a sub discharge (pre-discharge) is generated in the inter-electrode gap. In response to this, when the sub discharge (pre-discharge) generated in the inter-electrode gap is detected, one or both of the upper and lower main-switching elements 14, 16 are turned on, and a pulse voltage output from the main-discharge power supply 8 is applied to the inter-electrode gap to supply the main discharge current in either one of the one-side feeding system using the upper-side feeding path or the lower-side feeding path and the upper-and-lower-both-side feeding system using both of the upper and lower side feeding paths simultaneously.

Specifically, in the one-side feeding system using the upper-side feeding path, when the upper main-switching element 14 is turned on and the lower main-switching element 16 is turned off, only the upper main-feeder line 13 is closed, so that the main discharge current is supplied to the inter-electrode gap through the upper main-feeder line 13 and the upper feeding point 5.

On the other hand, in the one-side feeding system using the lower-side feeding path, when the upper main-switching element 14 is turned off and the lower main-switching element 16 is turned on, only the lower main-feeder line 15 is closed, so that the main discharge current is supplied to the inter-electrode gap through the lower main-feeder line 15 and the lower feeding point 6.

In the upper-and-lower-both-side feeding system using both of the upper and lower side feeding paths simultaneously, when the upper and lower main-switching elements 14, 16 are simultaneously turned on, the upper and lower main-feeder lines 13, 15 are closed simultaneously, so that the main discharge current is supplied to the inter-electrode gap through the upper and lower main-feeder lines 13, 15 and the upper and lower feeding points 5, 6.

The on-off control of the switching elements 10, 12, 14, 16 is performed in response to an output (driving signal) from an oscillator 19a to be described below. At the time of supplying the main discharge current by performing the on-off control of the upper and lower main-switching elements 14, 16, the on-off control of the upper and lower sub-switching elements 10, 12 is performed in conjunction with the corresponding upper and lower main-switching elements 14, 16 for the purpose thereof. The on-off control of the upper and lower main-switching elements 14, 16 is mainly explained.

In the first embodiment, in such power supply configuration, an open/close pattern setting unit 17a, a feeding-pulse-energy changing unit 18a, and an oscillator 19a are provided so that the main discharge current can be supplied by the main-discharge power supply 8 while switching between the upper-and-lower-both-side feeding system that concurrently uses upper and lower two feeding points and the one-side feeding system that uses one of the feeding points in accordance with feeding pulse energy by performing on-off control of the upper and lower main-switching elements 14, 16.

The significance of appropriately switching between the upper-and-lower-both-side feeding system and the one-side feeding system in accordance with the feeding pulse energy for supplying the main discharge current by the main-discharge power supply 8 is explained before explaining configuration and operation of the above.

A concentrated discharge can be a cause for wire breakage of the wire electrical discharge machining apparatus as well as insufficient cooling described in Patent Document 3 (JP 6-61663 B2). If a concentrated discharge occurs, machining energy on the concentrated discharge position of a wire electrode becomes larger than anticipated and overheating locally occurs, leading to wire breakage. Furthermore, if there is deviation of impedance between the upper-side feeding path and the lower-side feeding path, a difference arises in the discharge current value on the discharge position between feeding from the upper-side feeding path and feeding from the lower-side feeding path. Thus, when performing the upper-and-lower-both-side feeding system only, once the concentrated discharge occurs, the wire electrode is overheated on a side having a larger discharge current value, causing wire breakage occurrence more easily.

To prevent occurrence of a concentrated discharge, only one of the upper-side feeding and the lower-side feeding is performed. However, there is still a problem of frequent short circuit occurrences by performing only one-side feeding, resulting in lowering of the machining speed. Accordingly, a measure is considered of mixing the upper-and-lower-both-side feeding with the one-side feeding at an appropriate ratio to prevent frequent short circuit occurrences and enable stable machining.

Specifically, an open/close pattern for opening and closing the upper and lower main-feeder lines 13, 15 is predetermined to mix the upper-and-lower-both-side feeding with the one-side feeding at an appropriate ratio, and power is supplied in accordance with this pattern to prevent short circuit. At the same time, if there is a difference in discharge current value between the upper-side feeding path and the lower-side feeding path, the difference can be corrected to prevent wire breakage.

Figure 2:
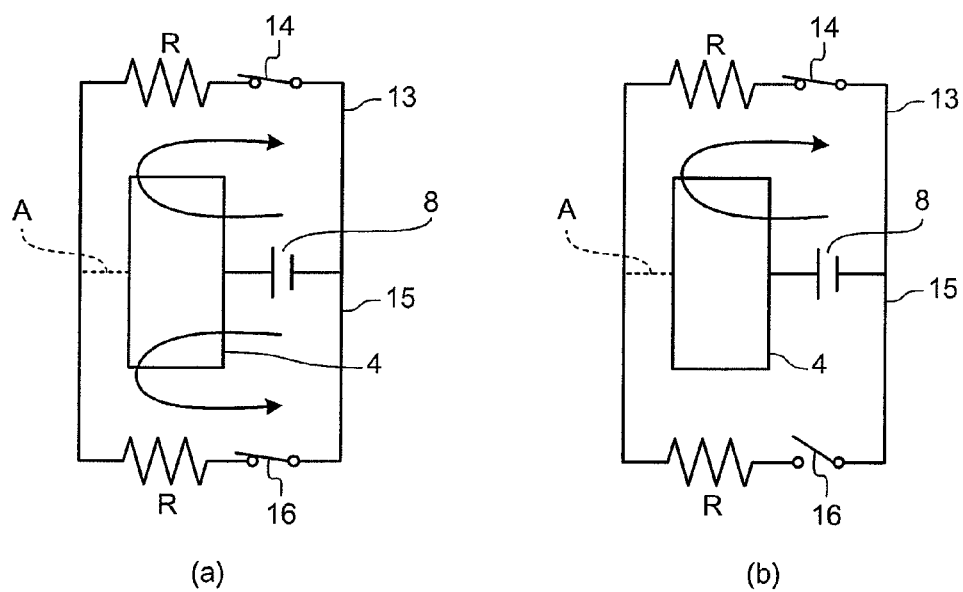
FIG. 2 is a diagram for explaining a difference in impedance between at the time of both-side feeding using upper-and-lower-both-side feeding paths and at the time of one-side feeding using one of feeding paths.

The problem to be solved when taking these measures is that a difference arises in the machining speeds at the time of the one-side feeding and the upper-and-lower-both-side feeding as mentioned above. FIG. 2 is a diagram for explaining a difference in impedance between at the time of upper-and-lower-both-side feeding using upper-and-lower-both-side feeding paths and at the time of one-side feeding using one of feeding paths.

In FIG. 2, (a) corresponds to the discharge current path at the time of the upper-and-lower-both-side feeding and (b) corresponds to the discharge current path at the time of the upper-side feeding. When a discharge point A is in the center in the up-down direction of the workpiece 4, if the impedances R have same values between the upper and lower main-feeder lines 13, 15 from a feeding-point-side electrode end of the main-discharge power supply 8 to the discharge point A, the discharge current path from the main-discharge power supply 8 to the discharge point A at the time of the upper-and-lower-both-side feeding has two circuits of an upper path and a lower path in parallel, so that impedance from the main-discharge power supply 8 to the discharge point A is R/2. On the other hand, the discharge current path at the time of the one-side feeding has only one of the upper-side feeding and the lower-side feeding, so that impedance in the discharge current path is R, which is larger than that at the time of the upper-and-lower-both-side feeding. This results in that the discharge current at the time of the one-side feeding is smaller than that at the time of the upper-and-lower-both-side feeding. Thus, as the number of the one-side feedings increases, the machining speed lowers (see Table 1).

TABLE 1

| Machining speed ratio when changing ratio of the number of one-side feedings | |
|---|---|
| One-side feedings only (One-side feeding ratio 100%) | 6.3 |
| One-side feedings + both-side feedings (One-side feeding ratio 60%) | 7.7 |
| One-side feedings + both-side feedings (One-side feeding ratio 40%) | 8.3 |
| Both-side feedings only (One-side feeding ratio 0%) | 10 |

Table 1 shows a verification result of machining speed comparison by changing the number of power feedings in each power feeding system. Based on the machining speed of 10 when one-side feeding ratio is 0%, that is, when performing upper-and-lower-both-side feedings only, the ratio of the number of one-side feedings is changed to 40%, 60%, and 100%. The machining speed ratio is 8.3 when the ratio of the number of one-side feedings is 40%, 7.7 at 60%, and 6.3 at 100%. As the result shows, the machining speed lowers as the ratio of the number of one-side feedings becomes higher.

Figure 3:
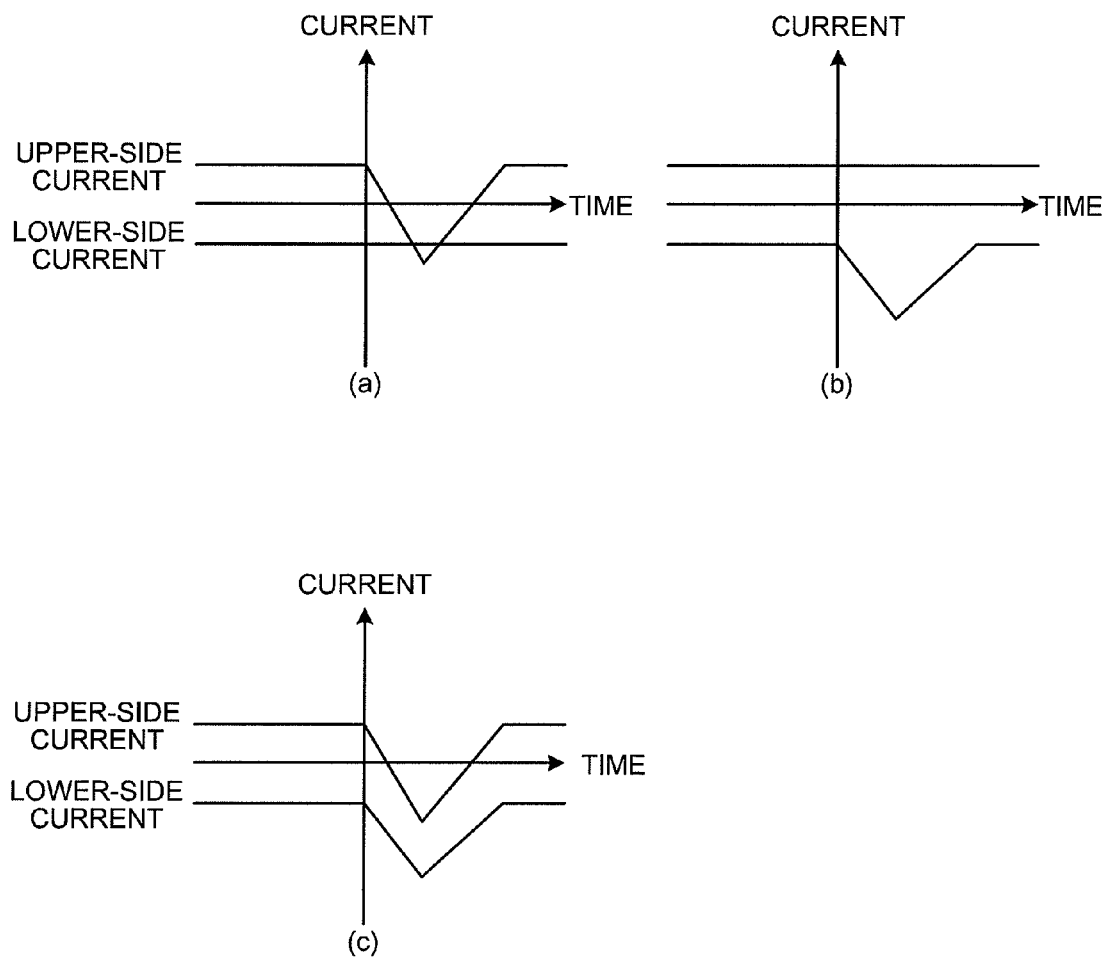
FIG. 3 is a diagram for explaining current waveforms at power feedings by various feeding systems shown in FIG. 2.

FIG. 3 is a diagram for explaining current waveforms at power feedings by various feeding systems shown in FIG. 2. In FIG. 3, (a) is a current waveform at the time of the upper-side feeding, (b) is a current waveform at the time of the lower-side feeding, and (c) is current waveforms at the time of the upper-and-lower-both-side feeding. The current flowing through the discharge point A shown in FIG. 2 is the upper-side current only at the time of the upper-side feeding as shown in (a), the lower-side current only at the time of the lower-side feeding as shown in (b), and the upper-side current and the lower-side current that are superimposed at the time of the upper-and-lower-both-side feeding as shown in (c), which therefore becomes larger than the current at the time of the upper-side feeding or at the time of the lower-side feeding.

This means that feeding pulse energy per feeding pulse used at the time of the one-side feeding can be increased up to nearly same level as that at the time of the upper-and-lower-both-side feeding that allows machining without causing wire breakage. In other words, if taking a measure for increasing the feeding pulse energy per feeding pulse at the time of the one-side feeding up to nearly same level as that at the time of upper-and-lower-both-side feeding, that is, taking a measure for reducing a difference in the feeding pulse energy between at the time of the upper-and-lower-both-side feeding and at the time of the one-side feeding, the machining speed at the time of the one-side feeding can be improved.

In FIG. 1, when supplying the main discharge current, the open/close pattern setting unit 17a performs on-off control of the upper and lower main switching elements 14, 16 and sets three open/close patterns of concurrently closing the upper and lower main discharge current paths, and closing one of the upper and lower main discharge current paths and opening the other path. The three open/close patterns are set such that the one-side feeding system and the upper-and-lower-both-side feeding system, of which the ratio of the number of power feedings is defined, are mixed at an appropriate ratio to prevent frequent short circuit occurrences, provide excellent machining speed, and reduce deviation of the discharge current value attributable to discharge position. The open/close pattern setting unit 17a outputs the open/close pattern used for a present power feeding system, to the feeding-pulse-energy changing unit 18a.

The feeding-pulse-energy changing unit 18a recognizes the present power feeding system by the open/close pattern from the open/close pattern setting unit 17a and generates an open/close pattern in which a pulse energy per feeding pulse is changed in present feeding pulse energy per feeding pulse that is defined by the open/close pattern received from the open/close pattern setting unit 17a to reduce the difference in the feeding pulse energy between at the time of the one-side feeding and at the time of the upper-and-lower-both-side feeding. As can be seen from the illustration of FIG. 3 above, the method for reducing the difference in the feeding pulse energy therebetween includes the method of reducing the feeding pulse energy per feeding pulse at the time of the upper-and-lower-both-side feeding to be smaller than a predetermined value and the method of increasing the feeding pulse energy per feeding pulse at the time of the one-side feeding to be larger than a predetermined value. Which method to adopt is predetermined and is applied to a recognized present power feeding system.

The oscillator 19a generates a drive signal for performing on-off control of a corresponding switching element to form a power feeding path in accordance with the open/close pattern to execute the present power feeding system received from the feeding-pulse-energy changing unit 18a and also generates a drive signal for performing on-off control of a corresponding switching element in the power feeding path to pour the feeding pulse energy that is changed by the feeding-pulse-energy changing unit 18a in the formed power feeding path.

The method of increasing or decreasing the feeding pulse energy includes the method of increasing or decreasing a feeding current value and the method of increasing or decreasing a feeding time length, any of which can be employed. When employing the method of increasing or decreasing the feeding current value, a plurality of the upper and lower main-switching elements 14, 16 is provided respectively in parallel to enable increasing or decreasing the number of the switching elements that are turned on at the same time in each of the upper and lower sides. In this case, the number of the switching elements that are turned on at the same time is determined in accordance with the physical characteristics such as impedance of the power feeding path. When employing the method of increasing or decreasing the feeding time length, because the upper and lower main-switching elements 14, 16 can be on-off controlled individually, only the on-operation time length of each switching element is increased or decreased. The on-operation time length to be increased or decreased at this case is also determined in accordance with the physical characteristics such as impedance of the power feeding path.

According to the first embodiment, when the power feeding is performed in the above-stated mixed mode of the upper-and-lower-both-side feeding system and the one-side feeding system for supplying main discharge current by the main discharge power supply, the difference in the feeding pulse energy between at the time of the upper-and-lower-both-side feeding and at the time of the one-side feeding can be made small, so that the machining speed at the time of the one-side feeding using the high impedance path can be improved.

Second Embodiment

Figure 4:
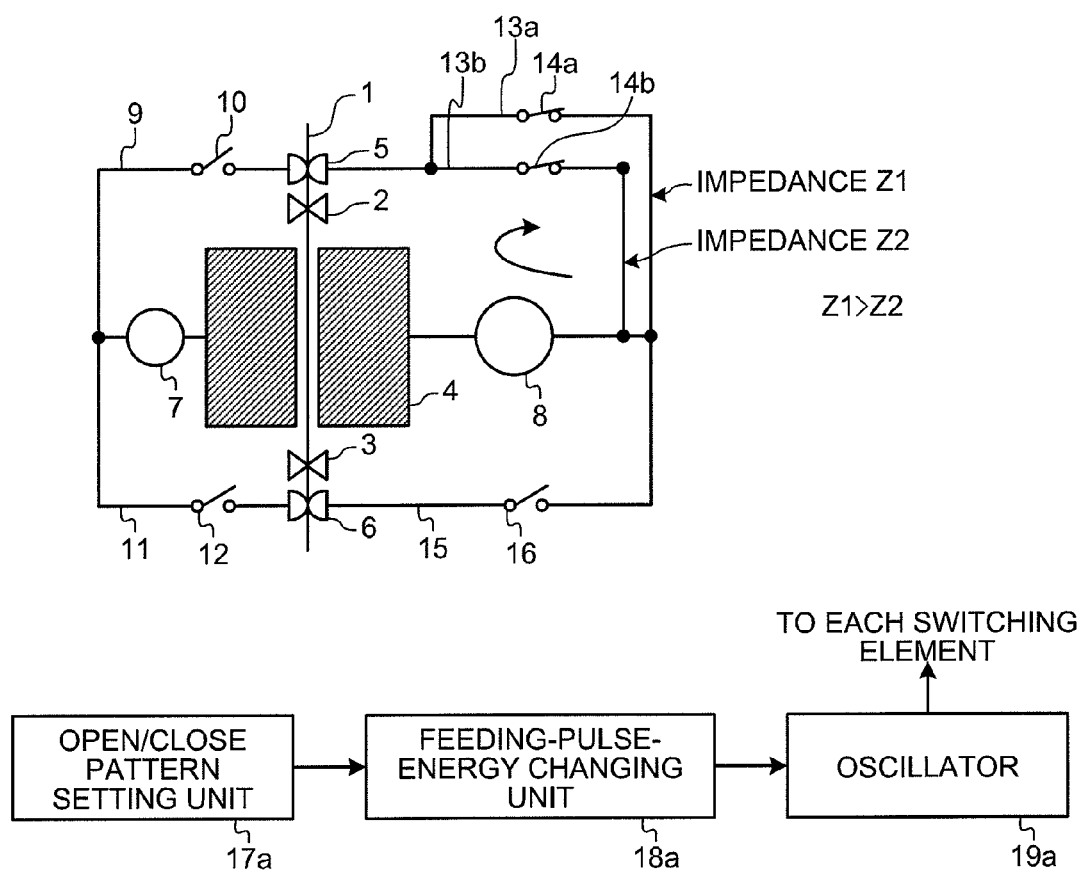
FIG. 4 is a schematic diagram illustrating a configuration of a relevant portion of a wire electrical discharge machining apparatus according to a second embodiment of the present invention.

FIG. 4 is a schematic diagram illustrating a configuration of a relevant portion of a wire electrical discharge machining apparatus according to the second embodiment of the present invention. In FIG. 4, the components that are the same or similar to those shown in FIG. 1 (first embodiment) are denoted by the same reference numerals. The components peculiar to the second embodiment are mainly explained below.

In the second embodiment, as another example for a mixed mode of feeding power from the high impedance path and power feeding from the low impedance path, a case is explained in which one of the upper-side feeding path and the lower-side feeding path is configured with a high impedance path and a low impedance path in parallel.

Namely, as shown in FIG. 4, in the wire electrical discharge machining apparatus according to the second embodiment having the upper main-feeder line 13 as an upper-side feeding path and the lower main-feeder line 15 as a lower-side feeding path in the configuration shown in FIG. 1 (first embodiment), for example, the upper main-feeder line 13 is configured with two parallel feeder lines of an upper main-high-impedance-feeder line 13a with impedance Z1 and an upper main-low-impedance-feeder line 13b with impedance Z2 that is smaller than the impedance Z1. An upper main-switching element 14a is provided in the upper main-low-impedance-feeder line 13b and an upper main-switching element 14b is provided in the upper main-low-impedance-feeder line 13b.

According to this configuration, in the one-side feeding using the upper-side feeding path, the power feeding can be switched between the power feeding from the high impedance path by closing the upper main-high-impedance-feeder line 13a by turning the upper main-switching element 14a on and the power feeding from the low impedance path by closing the upper main-low-impedance-feeder line 13b by turning the upper main-switching element 14b on.

In the wire electrical discharge machining apparatus, if a peak value of the discharge current varies, machining performance such as machining speed, surface roughness, and wire electrode consumption vary. In this case, for example, as shown in FIG. 4, when one of main-feeder lines is configured with two feeder lines having different impedances, it is possible to switch between the high-impedance feeder line to which high-peak-value discharge current flows and the low-impedance feeder line to which low-peak-value discharge current flows. Thus, the machining performance is adjustable.

In this case, when performing the power feeding using the upper-side feeding path, the discharge current that passes through the upper main-high-impedance-feeder line 13a is smaller than the discharge current that passes through the upper main-low-impedance-feeder line 13b, so that the machining speed lowers.

Accordingly, in the second embodiment, the open/close pattern setting unit 17a, the feeding-pulse-energy changing unit 18a, and the oscillator 19a respectively sets the open/close pattern, changes the feeding pulse energy per feeding pulse, and performs the on-off control of the upper main-switching elements 14a, 14b based on the same idea as explained in the first embodiment, whereby difference in the feeding pulse energy per feeding pulse between at the time of the power feeding from the upper main-high-impedance-feeder line 13a and at the time of the power feeding from the upper main-low-impedance-feeder line 13b is made small.

Specifically, the feeding pulse energy per feeding pulse at the time of the power feeding from the upper main-high-impedance-feeder line 13a is made larger than a predetermined value. Otherwise, the feeding pulse energy per feeding pulse at the time of the power feeding from the upper main-low-impedance-feeder line 13b is made smaller than a predetermined value, thus enabling to improve the machining speed at the time of the power feeding from the high impedance line.

As stated above, according to the second embodiment, as another example for a mixed mode of feeding power from the high impedance path and power feeding from the low impedance path, even when configuring one of the upper-side feeding path and the lower-side feeding path with the high impedance path and the low impedance path in parallel, the machining speed at the time of the power feeding from the high impedance path can be improved similarly to the first embodiment.

Third Embodiment

Figure 5:
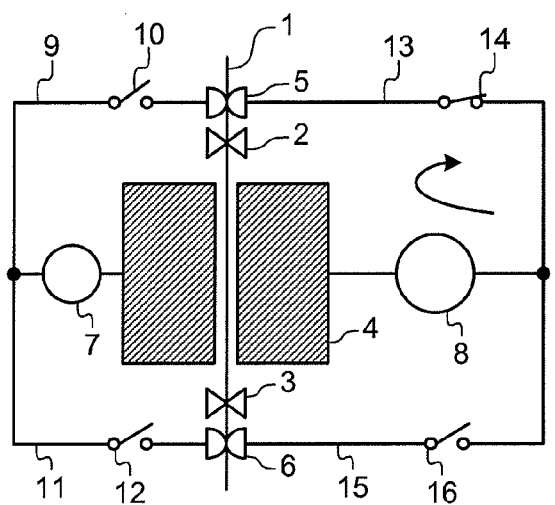
FIG. 5 is a schematic diagram illustrating a configuration of a relevant portion of a wire electrical discharge machining apparatus according to a third embodiment of the present invention.
Figure 5:
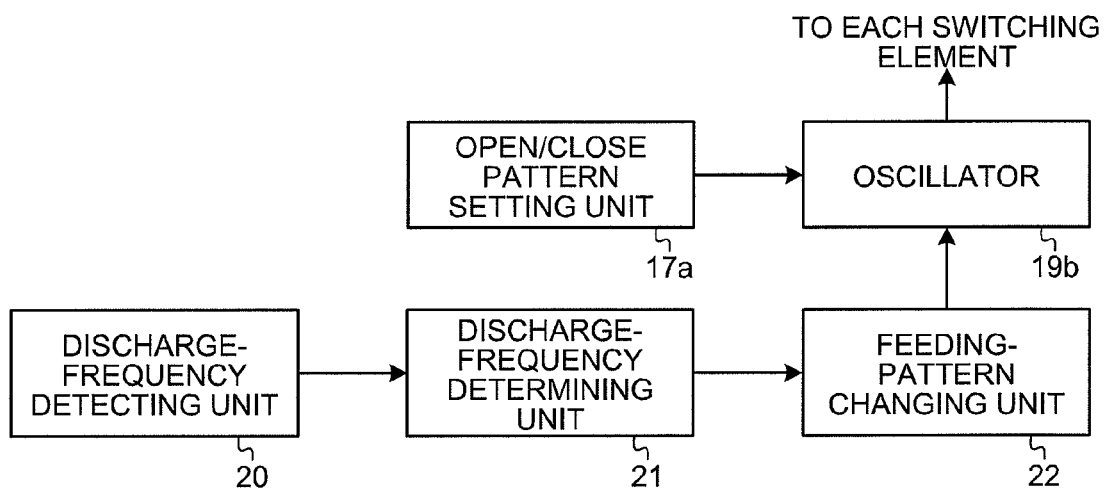

FIG. 5 is a schematic diagram illustrating a configuration of a relevant portion of a wire electrical discharge machining apparatus according to the third embodiment of the present invention. In FIG. 5, the components that are the same or similar to those shown in FIG. 1 (first embodiment) are denoted by the same reference numerals. The components peculiar to the third embodiment are mainly explained below.

In the wire electrical discharge machining apparatus, the machining speed increases as discharge frequency raises, however the possibility of wire breakage increases. On the contrary, the possibility of wire breakage decreases as the discharge frequency lowers, however the machining speed tends to lower. Accordingly, the third embodiment illustrates an example that enables to change a ratio of the number of power feedings between at the time of the one-side feeding which is the power feeding from the high impedance path and at the time of the power feeding from the upper-and-lower-both-side feeding which is the power feeding from the low impedance path in the configuration shown in FIG. 1 in accordance with the magnitude of the discharge frequency.

That is, as shown in FIG. 5, the wire electrical discharge machining apparatus according to the third embodiment is configured such that the feeding-pulse-energy changing unit 18*a* is omitted from the configuration shown in FIG. 1 (first embodiment), output from the open/close pattern setting unit 17*a* is directly given to an oscillator 19*b* with a changed symbol, and a discharge-frequency detecting unit 20, a discharge-frequency determining unit 21, and a feeding-pattern changing unit 22 are added to directly provide output from the feeding-pattern changing unit 22 to the oscillator 19*b*.

The discharge-frequency detecting unit 20, for example, uses inter-electrode average voltage between the wire electrode 1 and the workpiece 4 to detect discharge frequency by determining the discharge frequency as low when the inter-electrode average voltage is high and determining the discharge frequency as high when the inter-electrode average voltage is low.

The discharge-frequency determining unit 21 has a preset threshold value for determining a magnitude of the discharge frequency and determines the magnitude of the present discharge frequency by comparing a magnitude relation between the discharge frequency detected by the discharge-frequency detecting unit 20 and the threshold value.

When the discharge frequency is determined as high by the discharge-frequency determining unit 21, the feeding-pattern changing unit 22 generates an open/close pattern in which the ratio of the number of power feedings for the one-side feeding is increased in accordance with the ratio of the number of power feedings for the predetermined high discharge frequency and provides to the oscillator 19*b*. By contrast, when the discharge frequency is determined as low, the feeding-pattern changing unit 22 generates an open/close pattern in which the ratio of the number of power feedings for the upper-and-lower-both-side feeding is increased in accordance with the ratio of the number of power feedings for the predetermined low discharge frequency and provides to the oscillator 19*b*.

In this manner, the feeding-pattern changing unit 22 changes the ratio of the number of power feedings of the open/close pattern for the one-side feeding and the open/close pattern for the upper-and-lower-both-side feeding set by the open/close pattern setting unit 17*a* to the open/close pattern for the one-side feeding and the open/close pattern for the upper-and-lower-both-side feeding that respectively have different ratio of the number of power feedings in accordance with each discharge frequency.

When performing the present power feeding system in accordance with the open/close pattern received from the open/close pattern setting unit 17*a*, upon receiving a changed open/close pattern from the feeding-pattern changing unit 22, the oscillator 19*b* uses the ratio of the number of power feedings designated by the open/close pattern received from the feeding-pattern changing unit 22 and does not use the ratio of the number of power feedings designated by the open/close pattern received from the open/close pattern setting unit 17*a* to output drive signals for performing the on-off control of a corresponding switching element for the number of the power feedings.

As stated above, according to the third embodiment, the ratio of the number of the one-side feedings is high when the discharge frequency is high, and the ratio of the number of the upper-and-lower-both-side feedings is high when the discharge frequency is low, so that the improvement of the machining speed and the prevention of the wire breakage can be realized.

The third embodiment illustrates an example applied to the first embodiment, which however can be applied to the second embodiment similarly.

Fourth Embodiment

Figure 6:
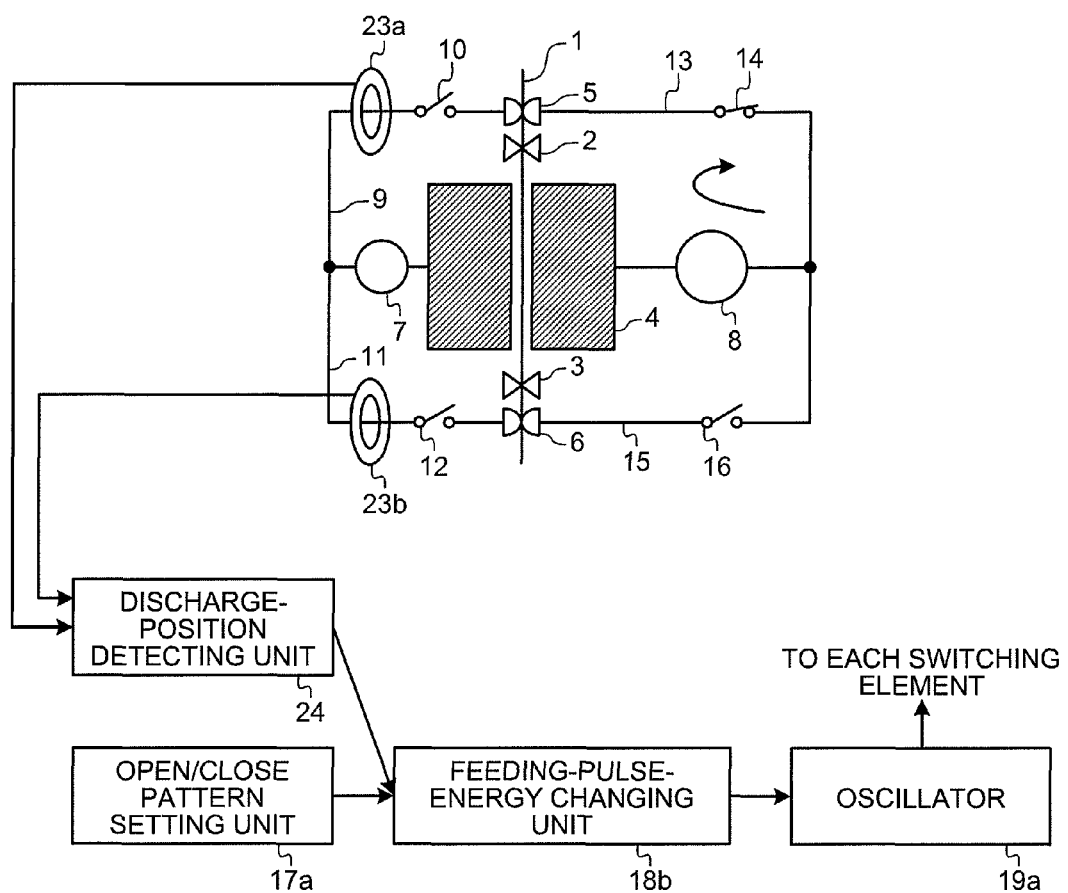
FIG. 6 is a schematic diagram illustrating a configuration of a relevant portion of a wire electrical discharge machining apparatus according to a fourth embodiment of the present invention.

FIG. 6 is a schematic diagram illustrating a configuration of a relevant portion of a wire electrical discharge machining apparatus according to the fourth embodiment of the present invention. In FIG. 6, the components that are the same or similar to those shown in FIG. 1 (first embodiment) are denoted by the same reference numerals. The components peculiar to the fourth embodiment are mainly explained below.

The method for uniformly increasing the feeding pulse energy at the time of the one-side feeding is explained in the first embodiment, however heat value per unit volume of a wire electrode gets large at the time of the one-side feeding, so that the feeding pulse energy that allows machining without wire breakage is lower than that at the time of the upper-and-lower-both-side feeding. That is, as shown in FIG. 1, at the time of the upper-side feeding, the discharge current flows to the discharge point from the upper position of the wire electrode 1 with which the upper feeding point 5 is slidingly in contact, and at the time of the lower-side feeding, the discharge current flows to the discharge point from the lower position of the wire electrode 1 with which the lower feeding point 6 is slidingly in contact. On the other hand, at the time of the upper-and-lower-both-side feeding, the discharge currents flow to the discharge point from both the upper and lower positions of the wire electrode 1 with which the upper feeding point 5 and the lower feeding point 6 are slidingly in contact.

In this manner, the discharge current is divided into the currents from the upper and lower positions of the wire electrode 1 at the time of the upper-and-lower-both-side feeding. By contrast, the discharge current flows only from one of the upper position and the lower position of the wire electrode 1 at the time of the one-side feeding. Thus, the heat value per unit volume of the wire electrode 1 is larger at the time of the one-side feeding. As a result, when the feeding pulse energy is made larger at the time of the one-side feeding, the heat value increases resulting in that wire breakage tends to occur easily.

In the wire electrical discharge machining apparatus, machining liquid nozzles are provided on a wire running path of the wire electrode 1 at positions that are close in the up-down direction with an opposing position to the workpiece 4 therebetween. High-pressure machining liquid is ejected from the machining liquid nozzles into the machining gap from upward and downward between the wire electrode 1 and the workpiece 4, so that the wire electrode 1 is cooled, which is a cooling measure taken for preventing overheating of the wire electrode 1 at discharging. By this cooling measure, the both-end sides of the wire electrode 1 in the machining gap are more sufficiently cooled than the center portion in the up-down direction by the machining liquid.

That is, if utilizing the cooling effect equipped in the wire electrical discharge machining apparatus, when the discharge positions are on the both-end sides in the machining gap at the time of the one-side feeding, the feeding pulse energy per feeding pulse can be made larger. On the contrary, when the discharge position is in the center portion in the up-down direction in the machining gap, the feeding pulse energy per feeding pulse is not made larger.

Accordingly, in the forth embodiment, a case is explained in which the feeding pulse energy per feeding pulse is not uniformly increased to be supplied at the time of the power feeding from the high impedance path, instead, the magnitude is changed in accordance with the discharge positions. Namely, in the configuration shown in FIG. 1 (first embodiment), as shown in FIG. 6, the wire electrical discharge machining apparatus according to the forth embodiment further includes a current sensor 23a that measures current flowing in the upper sub-feeder line 9, a current sensor 23b that measures current flowing in the lower sub-feeder line 11, and a discharge-position detecting unit 24 that receives both outputs such that feeding pulse energy, in which output from the discharge-position detecting unit 24 is given to a feeding-pulse-energy changing unit 18b with a changed symbol, and the feeding pulse energy per feeding pulse supplied at the time of the one-side feeding can be changed in accordance with the discharge positions as the above manner.

The discharge-position detecting unit 24 calculates the discharge position based on the current values measured by the current sensors 23a, 23b. The up-down direction of the machining gap is divided into three and reference points are provided on the respective division points on the upper and lower positions for determining the discharge position. The positional relation between calculated discharge position and both the reference points on the upper and lower portions is checked and the discharge position is determined whether it is on the upper end side, on the lower end side, or near the center in the up-down direction in the machining gap.

Specifically, when the calculated discharge position is on the upper side from the upper reference point, the discharge position is determined as being located on the upper end side in the machining gap. When being positioned between the upper and lower reference points, the discharge position is determined as being located near the center in the up-down direction of the machining gap. When being positioned on the lower side from the lower reference point, the discharge position is determined as being located on the lower end side in the machining gap.

The feeding-pulse-energy changing unit 18b uses the open/close pattern used for the present power feeding system received from the open/close pattern setting unit 17a and the discharge position received from the discharge-position detecting unit 24 to generate an open/close pattern having the feeding pulse energy per feeding pulse that is made larger than that set by the open/close pattern setting unit 17a at the time of the one-side feeding and when the discharge position is on the upper end side or on the lower end side in the machining gap, which is output to the oscillator 19a. By contrast, when the discharge position is near the center in the up-down direction of the machining gap, the feeding-pulse-energy changing unit 18b generates an open-close pattern in which the feeding pulse energy is not made larger than the above increased one, which is output to the oscillator 19a.

The method for increasing and decreasing the feeding pulse energy and the operation of the oscillator 19a are the same as those explained in the first embodiment.

As stated above, when discharging is performed on the discharge position of the upper end side or the lower-end side in the machining gap at which cooling by the machining liquid is sufficiently performed, the feeding pulse energy at the time of the one-side feeding is large, so that the machining speed can be improved. When discharging is performed on the discharge position near the center in the up-down direction in the machining gap at which cooling by the machining liquid tends to be insufficient, the feeding pulse energy can not be as large as the level at sufficiently cooled positions, so that overheating of the wire electrode can be suppressed. Therefore, wire breakage due to overheating of the wire electrode can be prevented, in accordance of which the machining speed at wire-breakage-occurrence limit can be improved, leading to improved machining speed.

FIG. 6 illustrates a case of installing current sensors in the upper and lower sub-feeder lines respectively. However, the current sensors can be installed in the upper and lower main-feeder lines.

The forth embodiment illustrates an example applied to the first embodiment, which however can be applied to the second embodiment similarly.

Fifth Embodiment

Figure 7:
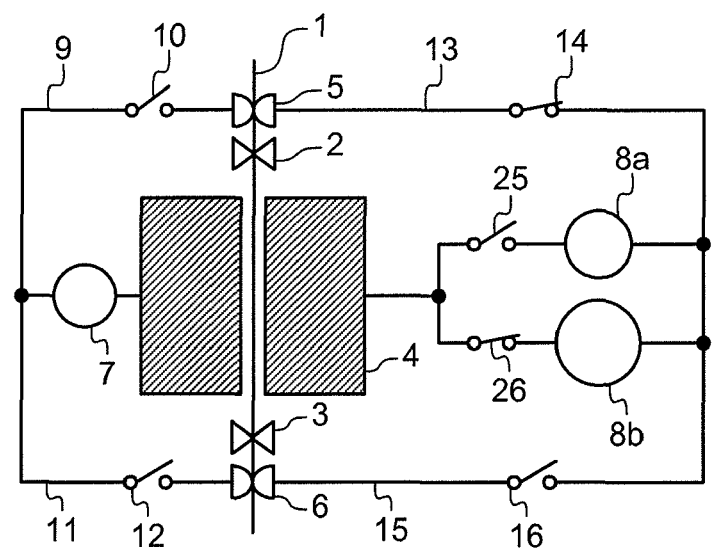
FIG. 7 is a schematic diagram illustrating a configuration of a relevant portion of a wire electrical discharge machining apparatus according to a fifth embodiment of the present invention.
Figure 7:
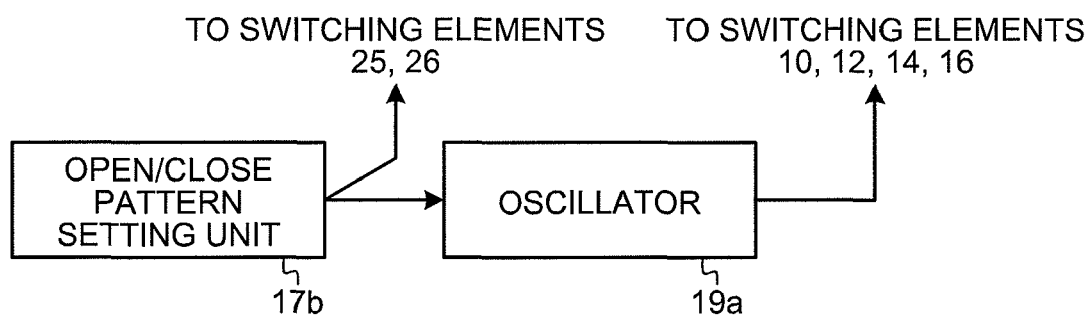

FIG. 7 is a schematic diagram illustrating a configuration of a relevant portion of a wire electrical discharge machining apparatus according to the fifth embodiment of the present invention. In FIG. 7, the components that are the same or similar to those shown in FIG. 1 (first embodiment) are denoted by the same reference numeral. The components related to the fifth embodiment are mainly explained.

The first embodiment illustrates a case of increasing a feeding current value and a feeding time length as the method of increasing the feeding pulse energy at the time of the one-side feeding. The fifth embodiment illustrates the method of increasing the feeding pulse energy at the time of the one-side feeding by using a different machining power supply that can supply a machining current larger than that at the time of the upper-and-lower-both-side feeding.

That is, as shown in FIG. 7, the wire electrical discharge machining apparatus according to the fifth embodiment includes a small-current main-discharge power supply 8a and a large-current main-discharge power supply 8b instead of the main-discharge power supply 8 in the configuration shown in FIG. 1 (first embodiment). The feeding-point-side electrode ends of the small-current main-discharge power supply 8a and the large-current main-discharge power supply 8b are respectively connected to the upper and lower main-feeder lines 13, 15 in parallel. The workpiece-side electrode end of the small-current main-discharge power supply 8a is connected to the workpiece 4 through a small-current selecting switching element 25 and the workpiece-side electrode end of the large-current main-discharge power supply 8b is connected to the workpiece 4 through a large-current selecting switching element 26 in parallel. The feeding-pulse-energy changing unit 18a is omitted, and the small-current selecting switching element 25 and the large-current selecting switching element 26 perform on-off operations by an output (the open/close pattern) from an open/close pattern setting unit 17b with a changed symbol. Similarly to the first embodiment, the oscillator 19a performs the on-off controls of switching elements 10, 12, 14, and 16 provided in four feeder lines by the output (the open/close pattern) from the open/close pattern setting unit 17b.

With the above configuration, the upper and lower main-switching elements 14, 16 are concurrently turned on to concurrently close the upper and lower main-feeder lines 13, 15 and the small-current selecting switching element 25 is concurrently turned on at the time of the upper-and-lower-both-side feeding. Thus, the machining current from the small-current main-discharge power supply 8a is supplied to the workpiece 4 through the upper and lower main-feeder lines 13, 15 and the upper and lower feeding points 5, 6.

At the time of the upper-side feeding, the upper main-switching element 14 is turned on to close the upper main-feeder line 13 and the lower main-switching element 16 is concurrently turned off to open the lower main-feeder line 15. At the same time, the large-current selecting switching element 26 is turned on and the small-current selecting switching element 25 is turned off. Accordingly, the large-current main-discharge power supply 8b supplies machining current to the workpiece 4 through the upper main-feeder line 13 and the upper feeding point 5 to increase the feeding pulse energy per feeding pulse at the time of the one-side feeding.

At the time of the lower-side feeding, the lower main-switching element 16 is turned on to close the lower main-feeder line 15 and the upper main-switching element 14 is concurrently turned off to open the upper main-feeder line 13. At the same time, the large-current selecting switching element 26 is turned on and the small-current selecting switching element 25 is turned off. Accordingly, the large-current main-discharge power supply 8b supplies the machining current to the workpiece 4 through the lower main-feeder line 15 and the lower feeding point 6 to increase the feeding pulse energy per feeding pulse at the time of the one-side feeding.

As mentioned above, according to the fifth embodiment, a small-current-supplying machining power supply and a large-current-supplying machining power supply are provided as main machining power supplies to supply machining current to an inter-electrode gap, enabling to supply machining current at the time of one-side feeding larger than that at the time of upper-and-lower-both-side feeding, so that feeding pulse energy per feeding pulse at the time of one-side feeding can be made larger. Thus, the machining speed at the time of the one-side feeding that is the power feeding from a high impedance path can be improved.

The fifth embodiment illustrates an example applied to the first embodiment, which however can be applied to the second embodiment similarly.

INDUSTRIAL APPLICABILITY

As described above, a wire electrical discharge machining apparatus according to the present invention is advantageously used to improve machining speed at the time of power feeding from a high impedance path in a mixed use of power feedings from the high impedance path and a low impedance path.

The invention claimed is:

1. A wire electrical discharge machining apparatus, when comprising a high impedance path and a low impedance path as feeding paths for supplying a main discharge current from a machining power supply to an inter-electrode gap between a wire electrode and a workpiece, the wire electrical discharge machining apparatus comprising:
   a path open/close unit capable of separately opening and closing each of the high impedance path and the low impedance path;
   an open/close pattern setting unit that sets an open/close pattern in which a combination of closing one of the feeding paths and opening another one of the feeding paths is designated for switching power feeding between the high impedance path and the low impedance path;
   a feeding-pulse-energy changing unit that generates a new open/close pattern in which a pulse energy per feeding pulse is changed in a present feeding path indicated by the open/close pattern by the open/close pattern setting unit such that a difference between discharge pulse energy applied to the inter-electrode from the machining power supply when feeding power from the high impedance path, and a discharge pulse energy when feeding power from the low impedance path is reduced; and
   a drive unit that controls opening and closing of the path open/close unit in accordance with the new open/close pattern generated by the feeding-pulse-energy changing unit.

2. The wire electrical discharge machining apparatus according to claim 1, wherein the new open/close pattern generated by the feeding-pulse-energy changing unit in which the pulse energy per feeding pulse is changed is an open/close pattern with changed magnitude of the main discharge current.

3. The wire electrical discharge machining apparatus according to claim 1, wherein the new open/close pattern generated by the feeding-pulse-energy changing unit in which the pulse energy per feeding pulse is changed is an open/close pattern with changed time length of the main discharge current.

4. The wire electrical discharge machining apparatus according to claim 1, wherein
   the high impedance path is an upper-side path that runs through an upper-side feeding point provided in slidable contact with the wire electrode on an upper side of the workpiece or a lower-side path that runs through a lower-side feeding point provided in slidable contact with the wire electrode on a lower side of the workpiece, and
   the low impedance path is a path that uses both of the upper-side path and the lower-side path.

5. The wire electrical discharge machining apparatus according to claim 1, wherein the high impedance path and the low impedance path are arranged in parallel having different impedances and are one of the upper-side path that runs through the upper-side feeding point provided in slidable contact with the wire electrode on the upper side of the workpiece and the lower-side path that runs through the lower-side feeding point provided in slidable contact with the wire electrode on the lower side of the workpiece.

6. The wire electrical discharge machining apparatus according to claim 1, wherein the machining power supply comprises a main power supply and a sub power supply, wherein the sub power supply supplies power to the electrode via a lower sub-feeder line and an upper sub-feeder line and wherein the main power supply supplies power to the electrode via a lower main-feeder line and an upper main-feeder line, and wherein each of the lower main-feeder line, the lower sub-feeder line, the upper main-feeder line, and the upper sub-feeder line, has same path open/close unit.

7. The wire electrode discharge machining apparatus according to claim 6, wherein the same path open/close unit is a switch or a relay.

8. The wire electrical discharge machining apparatus according to claim 1, wherein the open/close pattern set by the open/close pattern setting unit is varied depending on a detected measured current.

* * * * *